(12) United States Patent
Abe et al.

(10) Patent No.: US 12,031,577 B2
(45) Date of Patent: *Jul. 9, 2024

(54) CRANKSHAFT AND METHOD OF MANUFACTURING THE SAME

(71) Applicant: NIPPON STEEL CORPORATION, Tokyo (JP)

(72) Inventors: Tatsuhiko Abe, Tokyo (JP); Satoru Okawa, Tokyo (JP); Masato Yuya, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 188 days.

This patent is subject to a terminal disclaimer.

(21) Appl. No.: 17/759,451

(22) PCT Filed: Feb. 19, 2021

(86) PCT No.: PCT/JP2021/006247
§ 371 (c)(1),
(2) Date: Jul. 26, 2022

(87) PCT Pub. No.: WO2021/172177
PCT Pub. Date: Sep. 2, 2021

(65) Prior Publication Data
US 2023/0146538 A1  May 11, 2023

(30) Foreign Application Priority Data
Feb. 25, 2020  (JP) ................................. 2020-029228

(51) Int. Cl.
*F16C 3/08* (2006.01)
*C23C 8/26* (2006.01)
(Continued)

(52) U.S. Cl.
CPC .................. *F16C 3/08* (2013.01); *C21D 7/13* (2013.01); *C22C 38/001* (2013.01);
(Continued)

(58) Field of Classification Search
None
See application file for complete search history.

(56) References Cited

U.S. PATENT DOCUMENTS

2010/0095923 A1* 4/2010 Maurin-Perrier ... C23C 16/0254
123/196 R
2017/0275741 A1* 9/2017 Nishitani ................. C21D 9/28
(Continued)

FOREIGN PATENT DOCUMENTS

JP  2001232546 A  8/2001
JP  2003277882 A  10/2003
(Continued)

OTHER PUBLICATIONS

Dieter Liedtke et al.;"Nitriding and Nitrocarburizing on Iron Materials"; pp. 22-25; Aug. 30, 2011.

*Primary Examiner* — Seth Dumbris
(74) *Attorney, Agent, or Firm* — Greer Burns & Crain Ltd.

(57) ABSTRACT

A crankshaft with improved seizure resistance is provided. A crankshaft having journals 11 and pins 12 includes a compound layer containing iron and nitrogen on its surface, wherein, in the compound layer, for both the journals 11 and pins 12, the porosity area ratio of the thinner one of a region from the surface to a depth of 3.0 μm and a region across the total thickness of the compound layer is not higher than 10.0%, and both the journals 11 and pins 12 have such a surface geometry that the arithmetical mean deviation of the primary profile, Pa, is not larger than 0.090 μm.

6 Claims, 3 Drawing Sheets

(51) Int. Cl.
*C21D 7/13* (2006.01)
*C22C 38/00* (2006.01)
*C22C 38/02* (2006.01)
*C22C 38/04* (2006.01)
*C22C 38/06* (2006.01)
*C22C 38/18* (2006.01)

(52) U.S. Cl.
CPC ............ *C22C 38/002* (2013.01); *C22C 38/02* (2013.01); *C22C 38/04* (2013.01); *C22C 38/06* (2013.01); *C22C 38/18* (2013.01); *C23C 8/26* (2013.01); *F16C 2202/04* (2013.01); *F16C 2202/10* (2013.01); *F16C 2206/04* (2013.01); *F16C 2223/02* (2013.01); *F16C 2223/14* (2013.01); *F16C 2223/30* (2013.01)

(56) References Cited

U.S. PATENT DOCUMENTS

| | | |
|---|---|---|
| 2020/0024720 A1 | 1/2020 | Umehara et al. |
| 2020/0362447 A1 | 11/2020 | Umehara et al. |

FOREIGN PATENT DOCUMENTS

| | | |
|---|---|---|
| JP | 2009275645 A | 11/2009 |
| JP | 2017218951 A | 12/2017 |
| JP | 2018070928 A | 5/2018 |
| JP | 2019019396 A | 2/2019 |
| WO | 2016072305 A1 | 5/2016 |
| WO | 2018066667 A1 | 4/2018 |
| WO | 2019098340 A1 | 5/2019 |

\* cited by examiner

CRANKSHAFT AND METHOD OF MANUFACTURING THE SAME

TECHNICAL FIELD

The present invention relates to a crankshaft and a method of manufacturing such a crankshaft.

BACKGROUND ART

Some crankshafts are nitrided prior to use in order to improve fatigue strength and wear resistance. A nitriding process that is commonly used for crankshafts is gas nitriding, which offers high productivity.

JP 2018-70928 A, WO 2018/066667 A1 and JP 2013-221203 A each describes controlling the nitriding potential during a nitriding process to form a dense compound layer made of γ' phase on the surface of the steel, thereby providing both high fatigue strength and bend-straightening performance.

Japanese Patent No. 5898092 describes a method of manufacturing a driving cam that includes performing a soft nitriding process on a sliding surface of a driving cam to form a hardened layer and a compound layer and then removing the compound layer such that the hardened layer is present at the surface of the sliding surface.

In addition to fatigue strength and wear resistance, seizure resistance is required of crankshafts. It has been proposed to improve seizure resistance by controlling the surface geometry of frictional parts.

JP 2017-218951 A teaches that the surface roughness Ra of a crankshaft for a freezing-machine compressor is to be not higher than 0.05 μm. WO 2016/072305 A1 teaches that, in a rotary slide bearing composed of a bearing and a shaft, the surface roughness Ra of the shaft is to be not higher than 0.10 μm. Japanese Patent No. 5199728 teaches that the surface roughness of the martensite layer or nitride layer of a crankshaft is to be lower than the surface roughness of the associated journal bearing.

PRIOR ART DOCUMENTS

Patent Documents

[Patent Document 1] JP 2018-70928 A
[Patent Document 2] WO 2018/066667 A1
[Patent Document 3] JP 2013-221203 A
[Patent Document 4] Japanese Patent No. 5898092
[Patent Document 5] JP 2017-218951 A
[Patent Document 6] WO 2016/072305 A1
[Patent Document 7] Japanese Patent No. 5199728

Non-Patent Documents

[Non-Patent Document 1] Dieter Liedtke et al., "Nitriding and Nitrocarburizing on Iron Materials", AGNE Gijutsu Center Inc., pp. 23 and 72, 2011

SUMMARY OF THE INVENTION

Problems to be Solved by the Invention

In recent years, lubricating oils with lower viscosities and crankshafts with frictional parts constituted by thinner shafts have been developed to improve fuel efficiency and, accordingly, even better seizure resistance is required of a crankshaft.

An object of the present invention is to provide a crankshaft with improved seizure resistance and a method of manufacturing such a crankshaft.

Means for Solving the Problems

A crankshaft according to an embodiment of the present invention is a crankshaft having a journal and a pin, including a compound layer containing iron and nitrogen on a surface thereof, wherein, in the compound layer, for each of the journal and pin, a porosity area ratio of a thinner one of a region from the surface to a depth of 3.0 μm and a region across a total thickness of the compound layer is not higher than 10.0%, and each of the journal and pin has such a surface geometry that an arithmetical mean deviation of a primary profile, Pa, is not larger than 0.090 μm.

A method of manufacturing a crankshaft according to an embodiment of the present invention is a method of manufacturing the above-described crankshaft, including: an intermediate grinding step for grinding a journal and a pin of an intermediate product of the crankshaft; after the intermediate grinding step, an intermediate lapping step for lapping the journal and pin of the intermediate product; after the intermediate lapping step, a nitriding step for nitriding the intermediate product; after the nitriding step, a grinding step for grinding the journal and pin of the intermediate product; after the grinding step, a rough-lapping step for lapping the journal and pin of the intermediate product using a film coated with alumina abrasive grains; and after the rough-lapping step, a finish-lapping step for lapping the journal and pin of the intermediate product using a film coated with diamond abrasive grains.

Effects of the Invention

The present invention provides a crankshaft with improved seizure resistance.

EMBODIMENTS FOR CARRYING OUT THE INVENTION

A nitriding process for a crankshaft is intended to improve wear resistance and/or fatigue strength. Meanwhile, sufficient research has not been conducted on the relationship between a nitriding process and seizure resistance. Particularly, the relationship between the compound layer formed during nitriding and seizure resistance has not been systematically investigated, although it has been pointed out that a compound layer with a high porosity area ratio works as an oil basin to contribute to an improvement in seizure resistance (Dieter Liedtke et al., "Nitriding and Nitrocarburizing on Iron Materials", AGNE Gijutsu Center Inc., p. 27, 2011).

Figure 1:
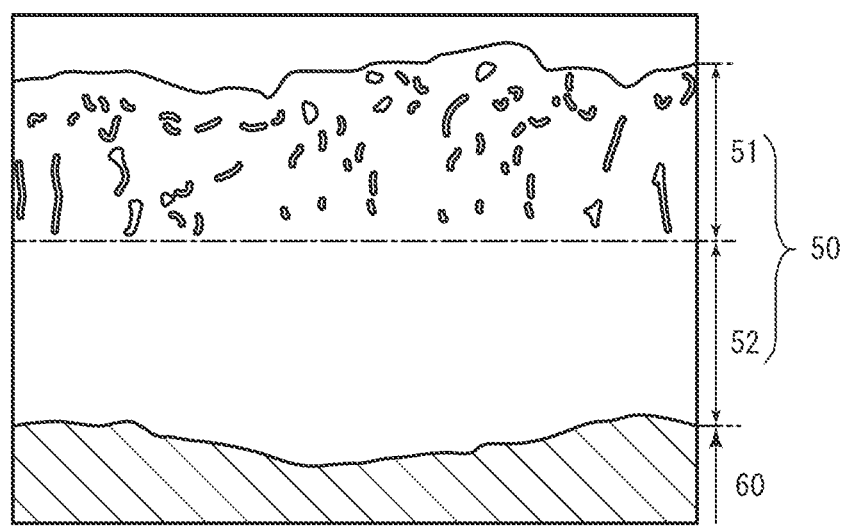
FIG. 1 is a schematic cross-sectional view of a near-surface structure of a steel that has been subjected to a typical gas nitriding process.

FIG. 1 is a schematic cross-sectional view of a near-surface structure of a steel that has been subjected to a typical gas nitriding process. On the surface of the steel is formed a compound layer 50 with a thickness of about several tens of micrometers. Below the compound layer 50, a nitrogen diffusion layer 60 is formed by nitrogen diffusing on the surface of the steel. The compound layer 50 includes a porous layer 51 located near the surface and having a high porosity area ratio, and a dense layer 52 located between the porous layer 51 and nitrogen diffusion layer 60 and having a low porosity area ratio.

It is known that the compound layer 50 includes ε phase ($Fe_{2-3}N$), γ' phase ($Fe_4N$), and α phase (αFe). Particularly, it is known that a compound layer 50 including such a porous layer 51 as mentioned above is mainly composed of ε phase. As disclosed in JP 2018-70928 A and WO 2018/066667 A1, mentioned above, it is also known that controlling the nitriding potential during nitriding can form a less porous compound layer mainly composed of γ' phase.

The present inventors conducted detailed research on the relationship between the compound layer and seizure resistance. Specifically, they evaluated the seizure resistance of (1) a steel with a compound layer mainly composed of ε phase and including a porous layer and a dense layer; (2) a steel with a compound layer mainly composed of ε phase and including only a dense layer after removal of the porous layer; (3) a steel with an exposed nitrogen diffusion layer after removal of the compound layer; and (4) a steel including a compound layer mainly composed of γ' phase.

The research showed that steels (2) and (4) had better seizure resistances than steels (1) and (3). This shows that the presence of a compound layer is advantageous in improving seizure resistance and that a compound layer with a lower porosity area ratio is advantageous in improving seizure resistance.

To improve seizure resistance, the surface geometry of frictional parts provided with a compound layer is also important. The present inventors have discovered that the seizure resistance of a nitrided crankshaft can be significantly improved over conventional crankshafts if the porosity area ratio of the near-surface portion of the compound layer is not higher than 10.0% and the arithmetical mean deviation of the primary profile, Pa, is not larger than 0.090 μm.

JP 2017-218951 A and WO 2016/072305 A1, mentioned above, each specify a surface geometry using the arithmetical mean deviation of the roughness profile, Ra (hereinafter referred to as "average roughness Ra"). However, specifying a geometry using the average roughness Ra has the following problems.

Figure 2:
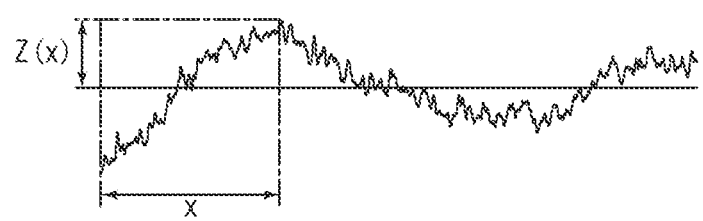
FIG. 2 shows an exemplary primary profile.
Figure 3:
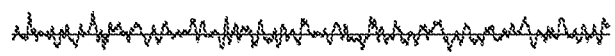
FIG. 3 shows an exemplary roughness profile.

FIGS. 2 and 3 show an exemplary primary profile and an exemplary roughness profile, respectively. The surface geometry of an industrial product, such as a crankshaft, includes not only short-period components (i.e., roughness), but also non-negligible levels of long-period components (i.e., undulations) caused by, for example, vibrations of the grinding machine. The average roughness Ra is based on the roughness profile (FIG. 3), which results from removal of the undulating components through a high-pass filter, and thus it cannot be said, without reserve, that the value exactly reflects the actual surface geometry. Further, the value of the average roughness Ra significantly varies depending on the cutoff value λc of the high-pass filter used to obtain the roughness profile. Actually, even for about the same level of average roughness Ra, seizure resistance significantly varies depending on the magnitude of undulations. Thus, an evaluation parameter using the primary profile (FIG. 2) as an assessed profile would be a more suitable indication used to control seizure resistance.

Generally, a nitriding process disadvantageously increases the surface roughness by about 1.5 to 2 times (Dieter Liedtke et al., "Nitriding and Nitrocarburizing on Iron Materials", AGNE Gijutsu Center Inc., p. 72, 2011). Thus, to reduce the arithmetical mean deviation of the primary profile Pa of a steel after nitriding, the steel must be polished after nitriding to provide a neat surface geometry. Meanwhile, the thickness of a compound layer that can be formed in an industrially realistic time is about several tens of micrometers. The small amount that can be polished means that, in order to reduce the arithmetical mean deviation of the primary profile Pa to 0.090 μm or below while leaving some compound layer, a sufficiently smooth surface geometry must be provided prior to polishing. This requires sufficient polishing prior to nitriding, not just after nitriding.

The present invention was made based on the above-described findings. Embodiments of the present invention will now be described in detail with reference to the drawings. The same or corresponding elements in the drawings are labeled with the same reference characters, and their description will not be repeated. The size ratios between the components shown in the drawings do not necessarily indicate the actual size ratios.

[Crankshaft]

Figure 4:
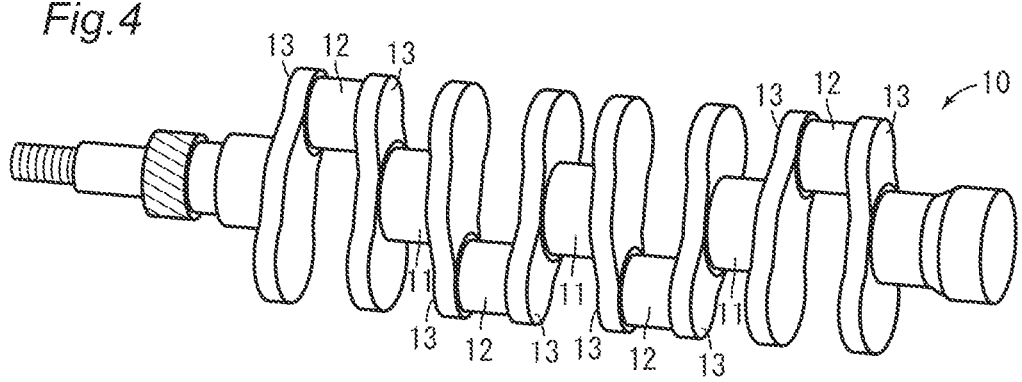
FIG. 4 is a schematic view of a crankshaft according to an embodiment of the present invention.

FIG. 4 is a schematic view of a crankshaft 10 according to an embodiment of the present invention. The crankshaft 10 includes journals 11, pins 12, and arms 13.

The journals 11 are coupled to a cylinder block (not shown). The pins 12 are coupled to connecting rods (not shown). The arms 13 connect the journals 11 and pins 12.

The crankshaft 10 may be made from a steel for machine structural use, for example. Although not limiting, the crankshaft 10 may be made from a carbon steel for machine structural use in accordance with JIS G 4051:2009; or an alloyed steel for machine structural use in accordance with JIS G 4053:2008, for example. Especially S45C, S50C and S53C in accordance with JIS G 4051:2009 and SMn438 in accordance with JIS G 4053:2008 are suitable, and such steel materials to which S has been added to improve machinability are particularly suitable.

The crankshaft 10 may have a chemical composition (i.e., chemical composition of a base material excluding the compound layer and nitrogen diffusion layer) including, for example, in mass %: 0.30 to 0.60% C; 0.01 to 2.0% Si; 0.1 to 2.0% Mn; 0.01 to 0.50% Cr; 0.001 to 0.06% Al; 0.001 to 0.02% N; up to 0.03% P; and up to 0.20% S, in addition to Fe and impurities. The chemical composition of the crankshaft 10 may include other elements. The chemical composition of the crankshaft 10 may include, for example, in mass %: 0 to 0.50% Mo; 0 to 0.50% Cu; 0 to 0.50% Ni; 0 to 0.050% Ti; 0 to 0.050% Nb; 0 to 0.005% Ca; 0 to 0.30% Bi; and 0 to 0.20% V.

A compound layer containing iron and nitrogen is formed on the surface of the crankshaft 10. The compound layer is mainly composed of an iron-nitrogen compound, but may contain small amounts of elements other than iron and nitrogen. Preferably, in the compound layer, the total content of the other elements other than iron and nitrogen is not higher than 10 mass %.

The compound layer typically covers the entire surface of the crankshaft 10. However, the compound layer is only required to cover the surfaces of the frictional parts, i.e., journals 11 and pins 12, and need not necessarily cover the entire surface of the crankshaft 10.

The compound layer may be mainly composed of ε phase ($Fe_{2-3}N$), or may be mainly composed of γ' phase ($Fe_4N$). The compound layer may be a mixture of ε and γ' phases.

In one implementation, the crankshaft 10 may include a compound layer in which the proportion of ε phase as represented by a cross-sectional area ratio is not lower than 80%. ε phase has a crystalline structure composed of a close-packed hexagonal lattice and has a better fatigue strength and a better wear resistance than γ' phase, and is thus convenient in applications where mechanical strength properties are important. Further, the coefficient of self-diffusion of ε phase is 10 times that of γ' phase or higher under the same temperature conditions, which means that ε phase can easily be produced. Thus, a crankshaft including a compound layer with high proportion of ε phase is more advantageous in manufacturing than a crankshaft including a compound layer with high proportion of γ' phase. The cross-sectional area ratio of ε phase is more preferably not lower than 90%.

In another implementation, the crankshaft 10 may include a compound layer in which the proportion of γ' phase as represented by a cross-sectional area ratio is not lower than 80%. γ' phase has a crystalline structure composed of a face-centered cubic lattice and has a coefficient of cubic expansion lower than that of ε phase by about 30%, and is thus convenient in applications where thermal stability, such as thermal-shock resistance, is important. The cross-sectional area ratio of γ' phase is more preferably not lower than 90%.

The proportions of ε phase, γ' phase and a phase in the compound layer can be determined by electron backscatter diffraction (EBSD). Specifically, an EBSD measurement is performed on a cross section of the compound layer, followed by mapping of the ε phase, γ' phase and a phase to determine the area ratio of these phases. It is appropriate that EBSD measurements for about 10 fields of view are performed with a magnification of approximately 4000 times.

In the compound layer, for both the journals 11 and pins 12, the porosity area ratio of a region from the surface to a depth of 3.0 μm is not higher than 10.0%. However, if the thickness of the compound layer is smaller than 3.0 μm, it is permitted that the porosity area ratio measured for the entire thickness be not higher than 10.0%. Porosity area ratio of the thinner one of a region from the surface to a depth of 3.0 μm and a region across the entire thickness of a compound layer will be hereinafter referred to as "surface-layer porosity area ratio" of the compound layer.

Although the mechanism is not clear, the lower the surface-layer porosity area ratio of a compound layer, the better seizure resistance. The surface-layer porosity area ratio of the compound layer of the journals 11 and pins 12 is preferably not higher than 5.0%, and more preferably not higher than 3.0%.

Surface-layer porosity area ratio can be measured in the following manner: A cross section of the compound layer is photographed by scanning electron microscopy (SEM) with a magnification of about 5000 times; 12 lines are drawn that are spaced apart from each other by 0.25 μm and parallel to the surface of the compound layer, together with 92 lines spaced apart from each other by 0.25 μm and perpendicular to the surface of the compound layer; and the proportion of those intersections of such lines which are in voids are treated as the surface-layer porosity area ratio.

The compound layer may have any surface-layer porosity area ratio for the crankshaft portions other than the journals 11 and pins 12. The compound layer over the entire crankshaft may have low surface-layer porosity area ratios, or only the layer portions over the journals 11 and pins 12 may have low surface-layer porosity area ratios.

The thickness of the compound layer for the journals 11 and pins 12 is preferably 1.0 to 50 μm. A lower limit for the thickness of the compound layer for the journals 11 and pins 12 is more preferably 2.0 μm, and yet more preferably 3.0 μm. An upper limit for the thickness of the compound layer for the journals 11 and pins 12 is more preferably 30 μm, and yet more preferably 20 μm, and still more preferably 8 μm. The compound layer may have any thickness for the crankshaft portions other than the journals 11 and pins 12.

The thickness of the compound layer can be measured in the following manner: A cross section of the compound layer is polished, etched by nital solution, and observed by optical microscopy. The compound layer, which appears as a white, uncorroded layer, is observed. 5 fields of view, in microstructure photographs taken by optical microscopy at a magnification of 500 times, are observed. For each field of view, the thickness of the compound layer is measured at 4 points that are horizontally arranged and spaced apart from each other by 30 μm. The average of the thickness values at the 20 measured points is treated as the thickness of the compound layer.

The hardness of the compound layer for the journals 11 and pins 12 is preferably HV500 to HV1000. A lower limit for the hardness of the compound layer for the journals 11 and pins 12 is more preferably HV700, and yet more preferably HV800. The compound layer may have any hardness for the crankshaft portions other than journals 11 and pins 12.

The journals 11, as well as the pins 12, have such a surface geometry that the arithmetical mean deviation of the primary profile Pa is not larger than 0.090 μm. As used herein, arithmetical mean deviation of a primary profile Pa is as defined by JIS B 0601:2001.

More specifically, the arithmetical mean deviation of the primary profile Pa is measured in the following manner: Test specimens are taken from the crankshaft 10 at locations for measurement (i.e., on the journals 11 and pins 12), and a contact-type roughness tester is used to obtain a measured primary profile. The contact roughness tester used has a stylus with a tip radius of 2 μm and a cone with a taper angle of 60°. The scan rate is 0.5 mm/s or lower, and the length for measurement is 5 mm or larger.

A low-pass filter with a cutoff value Xs is applied to the measured primary profile to obtain a primary profile. As shown in FIG. 2, using the primary profile as an assessed profile, the average of the absolute values of Z(x) for a length for evaluation 1 is calculated, which is treated as the arithmetical mean deviation of the primary profile Pa. Here, Z(x) is the vertical coordinate at a location x; the cutoff value Xs is 2.5 μm, and the length for evaluation is 5 mm.

As the surface-layer porosity area ratio of the compound layer is not higher than 10.0% and the arithmetical mean deviation of the primary profile Pa is not higher than 0.090 μm, seizure resistance will be significantly improved over conventional techniques. The arithmetical mean deviation of the primary profile Pa is preferably not higher than 0.080 μm.

[Method of Manufacturing Crankshaft]

An exemplary method of manufacturing the crankshaft 10 will now be described. The manufacturing method described below is merely illustrative and by no means limits the method of manufacturing the crankshaft 10.

Figure 5:
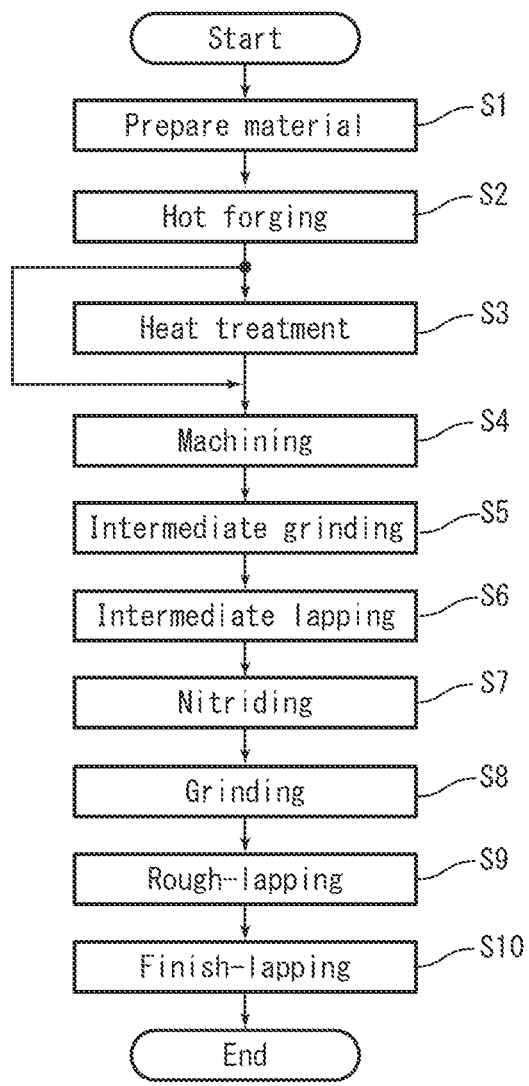
FIG. 5 is a flow chart illustrating an exemplary method of manufacturing the crankshaft of FIG. 4.

FIG. 5 is a flow chart illustrating an exemplary method of manufacturing the crankshaft 10. The manufacturing method includes a material preparation step (step S1), a hot forging step (step S2), a heat treatment step (step S3), a machining step (step S4), an intermediate grinding step (step S5), an intermediate lapping step (step S6), a nitriding step (step S7), a grinding step (step S8), a rough-lapping step (step S9), and a finish-lapping step (step S10). These steps will now be described in detail.

A material for a crankshaft is prepared (step S1). The material for a crankshaft is not limited to any particular chemical composition, and may be a steel for machine structural use mentioned above, for example. The material may be produced by, for example, continuously casting or blooming a steel melt having such a chemical composition as specified above.

The material is hot forged into a roughly shaped crankshaft (step S2). The hot forging process may be divided into rough forging and finish forging.

The roughly shaped crankshaft product produced by the hot forging may be subjected to a heat treatment, such as quenching, tempering and/or normalizing, as necessary (step S3). The heat treatment step (step S3) is an optional step, and may be omitted depending on the crankshaft properties required or other factors.

The roughly shaped crankshaft product is machined (step S4). Machining processes include cutting, grinding and hole drilling. This step results in an intermediate crankshaft product having a shape similar to that of the final product.

The journals and pins of the intermediate crankshaft product are subjected to intermediate grinding and intermediate lapping (steps S5 and S6). As discussed above, in the crankshaft according to the present embodiment, the arithmetical mean deviation of the primary profile Pa is not higher than 0.090 μm while some compound layer is left. This requires that the arithmetical mean deviation of the primary profile Pa of the journals and pins be reduced prior to the nitriding step (step S7). Preferably, the intermediate grinding and intermediate lapping reduce the arithmetical mean deviation of the primary profile Pa for both the journals and the pins to 0.15 μm or below.

The intermediate crankshaft product subjected to the intermediate grinding and intermediate lapping is nitrided (step S7). The nitriding process is performed in an atmosphere containing $NH_3$, $H_2$ and $N_2$, for example. The nitriding process may be performed in an atmosphere containing $CO_2$ in addition to $NH_3$, $H_2$ and $N_2$. The process temperature is 550 to 620° C., for example. The process time is 1.5 to 10 hours, for example.

At this time, the nitriding potential $K_n = P_{NH3}/(P_{H2})^{3/2}$ may be controlled to control the proportions of ε and γ' phases in the compound layer. $P_{NH3}$ and $P_{H2}$ indicate partial pressures of $NH_3$ and $H_2$, respectively. Specifically, increasing the nitriding potential $K_n$ increases the proportion of ε phase, whereas reducing the nitriding potential $K_n$ increases the proportion of γ' phase.

After nitriding, the journals and pins are ground again to provide a neat surface geometry (step S8). If the compound layer formed during nitriding includes a porous layer (denoted by numeral 51 in FIG. 1), this grinding step removes the porous layer.

Subsequently, the journals and pins are lapped (steps S9 and S10). This lapping process is divided into a rough-lapping step and a finish-lapping step, where the rough-lapping step uses a lapping film coated with alumina abrasive grains whereas the finish-lapping step uses a lapping film coated with diamond abrasive grains. This reduces the arithmetical mean deviation of the primary profile Pa to 0.090 μm or below while leaving some compound layer. It is difficult at this point to reduce the arithmetical mean deviation of the primary profile Pa to 0.090 μm or below while leaving some compound layer if the above-discussed intermediate grinding and intermediate lapping were not sufficient.

To reduce the arithmetical mean deviation of the primary profile Pa to 0.090 μm or below, it is necessary to reduce both the roughness and undulations during the intermediate grinding step (step S5) and grinding step (step S8). Especially the roughness depends on the size of the abrasive grains used for grinding. In view of this, it is preferable to use abrasive grains that are as small as possible for grinding.

On the journals and pins, undulations of periods of several hundreds of micrometers to several millimeters are present that have been caused by feeding and vibration of the tool during the machining step (step S4). Even if the roughness is sufficiently reduced (i.e., the arithmetical mean deviation of the roughness profile Ra is sufficiently reduced), the arithmetical mean deviation of the primary profile Pa does not decrease if undulations remain. In view of this, at the intermediate grinding step (step S5) and grinding step (step S8), undulations must be sufficiently removed by continuing grinding even after the deviation Ra has decreased.

Further, at the lapping steps (steps S6, S9 and S10), it is preferable to perform the following processes, (1) to (4), to prevent formation of a centrally recessed shape with a concave central portion: (1) polishing occurs while a lapping film with a small width is fed in the axial direction, which makes it easier for lubricating oil to reach the central portion of the lapping film; (2) abrasive grains with sizes that are as small as possible are used, which results in a small cutting depth, mitigating excessive grinding; (3) the rotating rate of the workpiece is increased while the pressing force is reduced, which increases the thickness of the oil (or water) film between the lapping film and workpiece; and (4) the amount of lubricant oil (or water) is increased, which increases the thickness of the oil (or water) film between the lapping film and workpiece.

Further, for each of the intermediate lapping step (step S6), rough-lapping step (step S9) and finish-lapping step (step S10), the feed rate of the lapping film in the axial direction of the crankshaft is to be as low as possible. This removes small undulations, thereby further reducing the arithmetical mean deviation of the primary profile Pa.

An exemplary construction of the crankshaft 10 according to an embodiment of the present invention and an exemplary method of manufacturing the same have been described. The embodiments provide a crankshaft with improved seizure resistance.

EXAMPLES

Now, the present invention will be described more specifically by means of examples. The present invention is not limited to these examples.

A steel having the chemical composition shown in Table 1 was used as a material to fabricate a plurality of test shafts for seizure tests.

TABLE 1

| Chemical composition (in mass %, balance Fe and impurities) | | | | | | | |
|---|---|---|---|---|---|---|---|
| C | Si | Mn | P | S | Cr | Al | N |
| 0.53 | 0.25 | 0.80 | 0.015 | 0.028 | 0.07 | 0.035 | 0.0050 |

Specifically, the material was heated at 1250° C. for one hour and then hot forged at about 1150° C.; upon completion of forging, the material was air cooled to room temperature. Thereafter, the material was machined (i.e., ground) to an outer diameter of about 53 mm.

After machining, intermediate grinding and intermediate lapping were performed to adjust the arithmetical mean deviation of the primary profile Pa to 0.15 μm or below. The intermediate lapping used a lapping film coated with alumina abrasive grains with grain diameters of 9 to 15 μm. For some test shafts, the intermediate grinding and intermediate lapping were omitted and the next step, i.e., nitriding, was performed to provide comparison.

The nitriding process performed was (A) a nitriding process for forming a compound layer mainly composed of ε phase, or (B) a nitriding process for forming a compound layer mainly composed of γ' phase. In both cases, the nitriding process was performed in an atmosphere containing ammonia, hydrogen and $CO_2$. In process (A), the nitriding potential $K_n$ was adjusted to a range of 1 to 10 and the temperature was maintained at 570° C. for 3 hours, followed by oil cooling. In process (B), the nitriding potential $K_n$ was adjusted to a range of 0.3 to 0.5 and the temperature was maintained at 570° C. for 8 hours, followed by oil cooling.

EBSD measurements showed that, on a test shaft subjected to process (A), a compound layer was formed in which the proportion of ε phase as represented by a cross-sectional area ratio was not lower than 90%, and, on a test specimen subjected to process (B), a compound layer was formed in which the proportion of γ' phase as represented by a cross-sectional area ratio was not lower than 90%.

The nitrided test shaft was subjected to grinding, rough-lapping, and finish-lapping. The grinding step was performed so as to leave some compound layer. A test shaft with a compound layer mainly composed of ε phase formed thereon was ground so as to remove the porous layer and leave the dense layer. The rough-lapping used a lapping film coated with alumina abrasive grains with grain diameters of 9 to 15 μm, whereas the finish-lapping used a lapping film coated with diamond abrasive grains with grain diameters of 1 to 3 μm (#8000 to #4000). The outer diameter of the test shaft was adjusted such that the clearance with a bearing to be used for seizure testing, discussed below, would be about 0.080 mm. Also fabricated were test shafts with the porous layer left, test shafts with the entire compound layer removed, and test shafts subjected to a simplified grinding step in which only the outer diameter was adjusted, to provide comparison.

The surface geometry, surface-layer porosity area ratio and hardness of each test shaft fabricated were measured. Surface geometry was measured by a contact-type roughness tester (SJ-412 from Mitutoyo Corporation). Hardness was measured by a nano-indenter.

Figure 6:
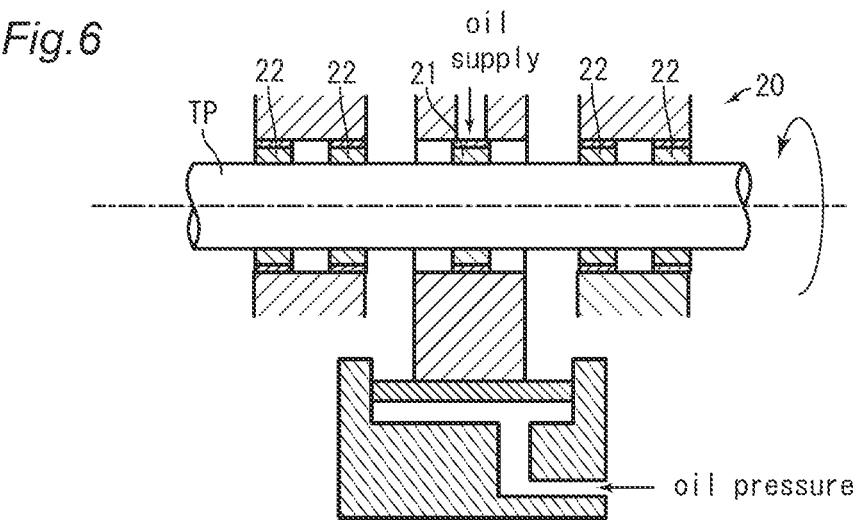
FIG. 6 is a schematic view of evaluation equipment used for seizure testing.
Figure 7:
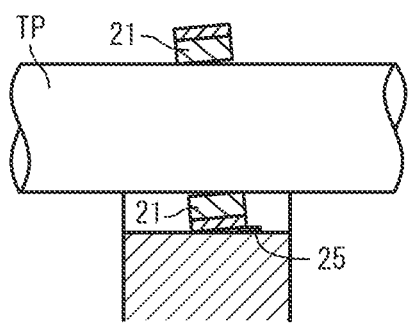
FIG. 7 is a schematic view of a bearing and nearby portions of the evaluation equipment of FIG. 6.

Seizure testing was conducted for each test shaft fabricated. A schematic view of evaluation equipment 20 used for seizure testing is shown in FIG. 6. The test shaft TP was inserted through the test bearings 21 and holding bearings 22, and rotated by a motor (not shown) at a circumferential speed of 20 m/s while the test bearings 21 were supplied with oil. As shown in FIG. 7, a shim 25 with a thickness of 30 μm was sandwiched between the housing of each test bearing 21 and the tester to force one-side hitting. The metal of the bearings used was a Bi/Cu alloy. The lubricating oil was VG22, the temperature of the oil being supplied was 100° C., and the amount of oil supply was 150 ml/min.

Figure 8:
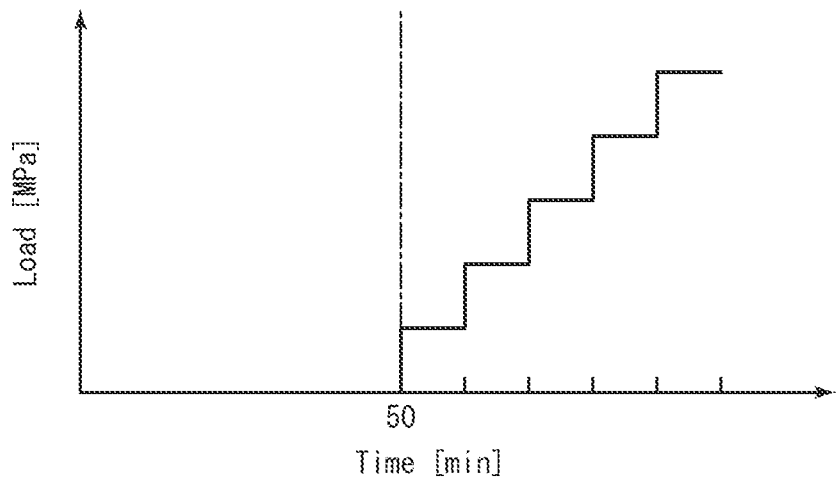
FIG. 8 schematically illustrates changes over time in the surface pressure applied to the test shaft.

After 50 minutes of running-in, a load was applied to the test bearings 21, and operation was continued while the surface pressure applied to the test shaft TP was increased stepwise until seizure occurred. FIG. 8 schematically illustrates changes over time in the surface pressure applied to the test shaft TP. The time for which the surface pressure was held at one and the same level was 10 minutes, and the increase in surface pressure for each step was 5 MPa. It was determined that seizure occurred when the temperature at the bearing's back side rose to 230° C. or above, or when the belt slipped due to variations in torque.

The manufacturing conditions and test results for the various test shafts are shown in Table 2. The entries in the column labeled "Surface-layer porosity area ratio" for test shaft marks K1, K2 and K3 show porosity area ratios in a region from the surface of the nitrogen diffusion layer to a depth of 3.0 μm.

TABLE 2

| Test shaft Mark | Interm. grinding, interm. lapping | Nitriding | Grinding, rough-lapping, finish-lapping | Pa (μm) | Surface layer porosity area ratio (%) | Hardness (HV) | Compound layer thickness (μm) | Seizure surface pressure (MPa) | Category |
|---|---|---|---|---|---|---|---|---|---|
| C1Z | yes | A | yes | 0.059 | 1.0 | 970 | 3.0 | 115 | inv. ex. |
| C1A | yes | A | yes | 0.061 | 1.3 | 980 | 3.5 | 110 | inv. ex. |
| G1A | yes | B | yes | 0.081 | 1.1 | 940 | 3.5 | 115 | inv. ex. |
| C1B | yes | A | yes | 0.085 | 2.0 | 870 | 4.1 | 105 | inv. ex. |
| C1C | yes | A | yes | 0.087 | 2.1 | 860 | 5.1 | 100 | inv. ex. |
| C1D | yes | A | yes | 0.089 | 2.4 | 840 | 7.3 | 100 | inv. ex. |
| G1B | yes | B | yes | 0.088 | 1.2 | 930 | 7.3 | 105 | inv. ex. |
| C2 | no | A | yes | 0.21 | 1.5 | 970 | 3.4 | 90 | comp. ex. |
| G2 | no | B | yes | 0.30 | 1.5 | 970 | 4.5 | 90 | comp. ex. |
| P1 | yes | A | yes | 0.079 | 12 | 920 | 15 | 90 | comp. ex. |
| P2 | yes | A | no | 0.39 | 12 | 840 | 13 | 80 | comp. ex. |
| P3 | yes | A | no | 0.49 | 14 | 900 | 16 | 55 | comp. ex. |
| K1 | no | A | yes | 0.079 | 0.1 | 420 | 0 | 85 | comp. ex. |
| K2 | no | A | yes | 0.072 | 0.1 | 410 | 0 | 80 | comp. ex. |
| K3 | no | A | yes | 0.069 | 0.1 | 410 | 0 | 85 | comp. ex. |

For each of the test shafts labeled with test shaft marks C1Z, C1A, G1A, C1B, C1C, C1D and G1B, the surface-layer porosity area ratio of the compound layer was not higher than 10.0%, and their surface geometry was such that the arithmetical mean deviation of the primary profile Pa was not larger than 0.090 μm. These test shafts had seizure surface pressures not lower than 100 MPa, showing good seizure resistance.

The test shafts labeled with test shaft marks C2 and G2 had seizure surface pressures lower than 100 MPa. This is presumably because the arithmetical mean deviation of the primary profile Pa was high in these test shafts. These test shafts, after nitriding, had been subjected to grinding, rough-lapping and finish-lapping, but not intermediate grinding and intermediate lapping, and thus failed to sufficiently reduce the arithmetical mean deviation of the primary profile Pa.

The test shafts labeled with test shaft marks P1, P2 and P3 had the porous layer left at the outermost surface of the compound layer. These test shafts had seizure surface pressures lower than 100 MPa.

The test shafts labeled with test shaft marks K1, K2 and K3 had its nitrogen diffusion layer exposed, with the compound layer completely removed. These test shafts had seizure surface pressures lower than 100 MPa.

Although embodiments of the present invention have been described, the above-described embodiments are merely illustrative examples useful for carrying out the present invention. Thus, the present invention is not limited to the above-described embodiments, and the above-described embodiments, when carried out, may be modified as appropriate without departing from the spirit of the invention.

The invention claimed is:

1. A crankshaft having a journal and a pin, including a compound layer containing iron and nitrogen on a surface thereof,
   wherein, in the compound layer, for each of the journal and pin, a porosity area ratio of a thinner one of a region from the surface to a depth of 3.0 μm and a region across a total thickness of the compound layer is not higher than 10.0%, and
   each of the journal and pin has such a surface geometry that an arithmetical mean deviation of a primary profile, Pa, is not larger than 0.090 μm.

2. The crankshaft according to claim 1, wherein the compound layer has a hardness of HV500 to HV1000.

3. The crankshaft according to claim 1, wherein, for each of the journal and pin, the compound layer has a thickness of 1.0 to 50 μm.

4. The crankshaft according to claim 1, wherein a proportion of ε phase in the compound layer as represented by a cross-sectional area ratio is not lower than 80%.

5. The crankshaft according to claim 1, wherein a proportion of γ' phase in the compound layer as represented by a cross-sectional area ratio is not lower than 80%.

6. A method of manufacturing the crankshaft according to claim 1, including:
   an intermediate grinding step for grinding a journal and a pin of an intermediate product of the crankshaft;
   after the intermediate grinding step, an intermediate lapping step for lapping the journal and pin of the intermediate product;
   after the intermediate lapping step, a nitriding step for nitriding the intermediate product;
   after the nitriding step, a grinding step for grinding the journal and pin of the intermediate product;
   after the grinding step, a rough-lapping step for lapping the journal and pin of the intermediate product using a film coated with alumina abrasive grains; and
   after the rough-lapping step, a finish-lapping step for lapping the journal and pin of the intermediate product using a film coated with diamond abrasive grains.

* * * * *